R. W. VAUGHAN.
WINDMILL.
APPLICATION FILED FEB. 24, 1910.

968,003.

Patented Aug. 23, 1910.

Witnesses,
H. Monteverde
J. B. Austin.

Inventor,
Robin W. Vaughan,
By J. A. Warpham
Attorney.

THE NORRIS PETERS CO., WASHINGTON, D. C.

UNITED STATES PATENT OFFICE.

ROBIN W. VAUGHAN, OF LOS ANGELES, CALIFORNIA.

WINDMILL.

968,003.  Specification of Letters Patent.  Patented Aug. 23, 1910.

Application filed February 24, 1910. Serial No. 545,707.

*To all whom it may concern:*

Be it known that I, ROBIN W. VAUGHAN, a citizen of the United States, residing in the city of Los Angeles, county of Los Angeles, State of California, have invented new and useful Improvements in Windmills, of which the following is a specification.

Wind mills as at present constructed and operated are of limited power owing to the fact that they must be mounted upon towers which provide a very unstable support for the mill if the blades are provided with a sufficient wind surface to produce any very great amount of power. Another source of weakness in ordinary wind mills arises from the fact that they must be shifted to present an effective face to the wind, thereby preventing the tower from being constructed to afford sufficient support to a mill having a large wind surface.

It is the principal object of my invention to avoid these defects by mounting my mill near the ground.

Another object is to construct a mill with two operating wheels which shall be set with their axles at right angles to each other and provide the mill with shields for directing the wind upon the vanes.

Figure 1:
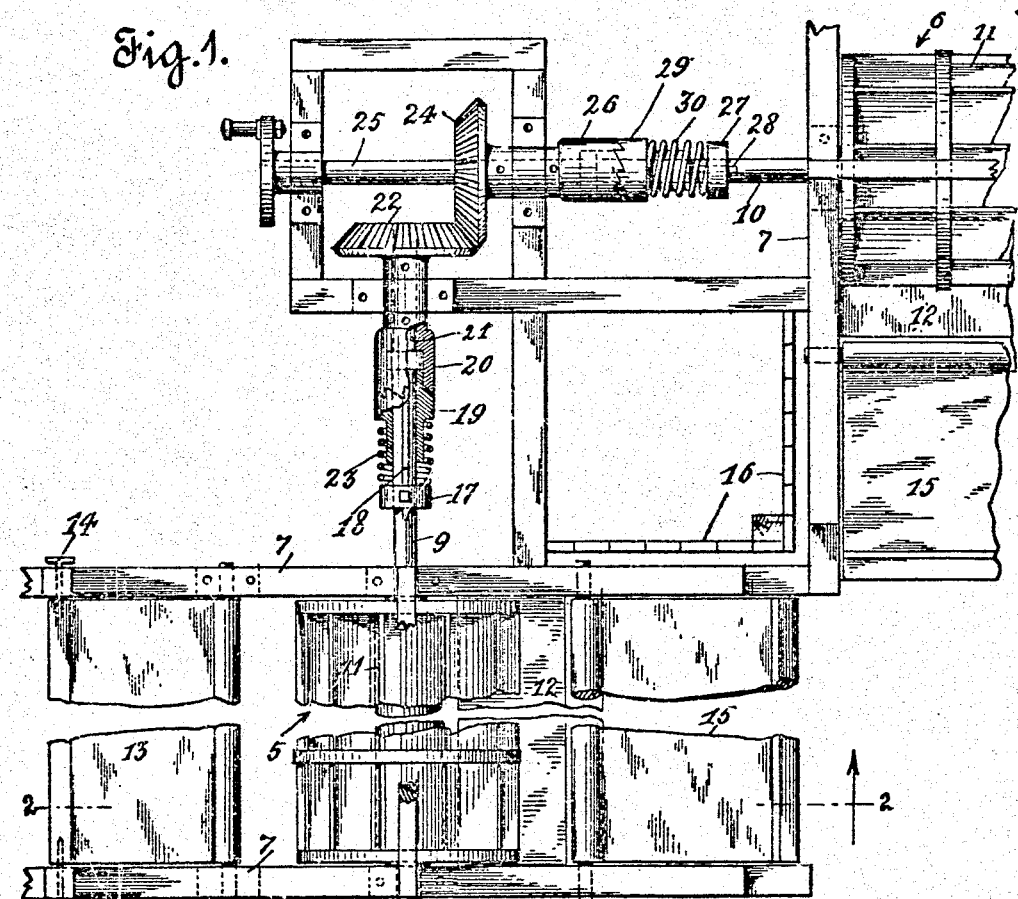
Figure 2:
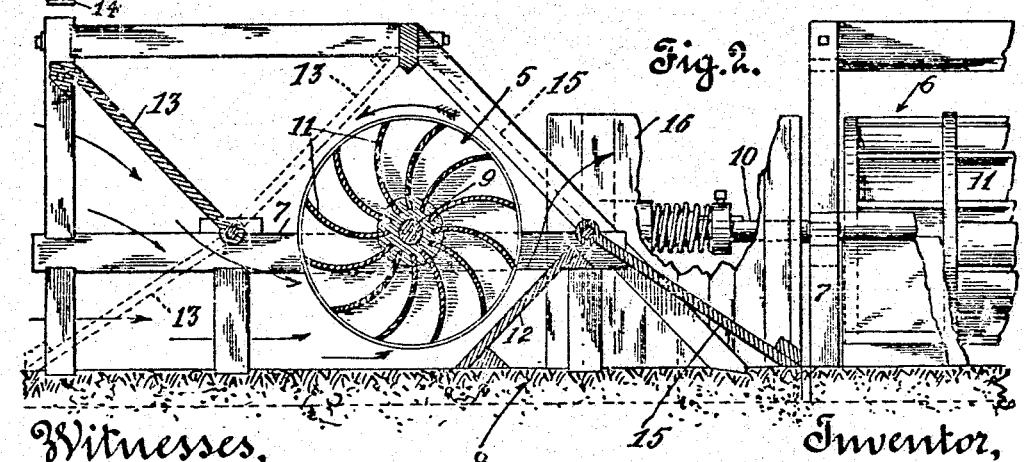

In the drawings accompanying this application and forming a part thereof; Figure 1 is a plan of my improved wind mill with parts broken away. Fig. 2 is a vertical section on the line 2—2 of Fig. 1.

In the drawings 5 and 6 are wind wheels which are revolubly mounted in suitable frame work 7 placed upon the ground 8 by means of axles 9 and 10, which axles are revolubly mounted in said frame work. These axles lie in a horizontal plane and the wheels are of any desired length and are preferably of the same length, and they are set with their axles in planes at right angles to each other. Where only one wheel is used it will be set with its axle on a line at right angles with the prevailing direction of the wind in the locality. The blades 11 are preferably curved as best shown in Fig. 2, but may be straight blades if desired. Extending along in front of the wind wheels are permanent barriers 12 which extend upwardly to the center of the wheel and extend preferably beneath the wheel as best shown in Fig. 2. These permanent barriers prevent the wind from striking the lower portion of the wheel when the wind is blowing in the direction opposite to that indicated by the arrows in Fig. 2, and the side on which these barriers are shown will be termed the front side of the wheels.

On the rear side of the wheel are pivotally mounted movable deflectors 13 which when the wind is blowing in the direction shown by the arrows in Fig. 2 are secured to the frame work in any suitable manner so as to protect the upper part of the wheel and deflect the wind downwardly and onto the lower half of the wheel, as shown in Fig. 2. These deflectors, when the wind is blowing in the opposite direction, rest in the position below the axle of the wheel as shown in dotted lines in the lower part of the left hand portion of Fig. 2. When it is desired to use these deflectors, as a protecting covering for the wheel, they are secured in the position shown in the upper part of Fig. 2, as shown in dotted lines. In the drawings I have shown deflectors 13 in their operative position and secured in the frame work by means of bolts 14 which pass through the frame work and into the ends of the deflectors as shown in dotted and full lines in Fig. 1, but any other means of fastening them may be used.

Adjacent to the top of the permanent barriers are pivoted protective aprons 15 which normally lie in the position shown in Fig. 2. These protective aprons can be turned on their pivot to the position shown in dotted lines in said figure, thereby preventing the wind from striking the upper half of the wheel, when the wind is blowing in an opposite direction to the arrows. I have also provided vertical barriers 16 between the wind wheels to deflect the wind upon the wheels that otherwise would pass between them when the wind is blowing angularly onto both wheels.

Axle 9 is provided with a collar 17 which is rigidly secured thereto at a distance from its inner end and with a spline 18 which extends from the collar to near the end of said axle. Upon the end of the axle and spline is mounted the movable member 19 of a clutch. The other member 20 of the clutch is rigidly secured upon a stub shaft 21 on the inner end of which is mounted the bevel gear 22. A coiled spring 23 mounted between collar 17 and the movable member of the clutch holds the two members of the clutch normally in engagement and permits the rigid clutch member to snap past the movable member, whenever the bevel gear on shaft 21 rotates its shaft more rapidly than wheel 5 rotates axle 9. Bevel gear 22 meshes with bevel gear 24 mounted upon the driven shaft 25, from which power is taken to operate the machinery not shown. Shaft 25 has secured upon its inner end a rigid clutch member 26. Axle 10 is provided with a collar 27, a spline 28 and a movable clutch member 29. This movable clutch member is normally held by spring 30 in engagement with the fixed clutch member on shaft 25.

In the operation of my wind wheels, when the wind is blowing directly against one of the wheels, that is in a direction at right angles to the axle thereof, the other wheel would be inoperative, but when the wind is blowing angularly to the axles of the wheels, both wheels will be operated at equal rates of speed when the wind strikes the wheels at the same angle, and both wheels will exert power to rotate the driven shaft. If however, the wind strikes one wheel at a greater angle than it does the other wheel, then only one wheel will operate the driven shaft. It will be understood that whenever the wind is blowing so as to strike the rear portion of the wheels the deflectors 13 must be raised so as to deflect the wind downwardly as shown by the arrows in Fig. 2, but that when the wind is blowing in the opposite direction, deflectors 13 would have the free ends thereof resting upon the ground. By free end is meant the end opposite the pivotal connection which connection unites the deflectors to the timbers of the frame. It will also be understood that in those situations where the direction of the wind is almost constantly in one direction only one wind wheel is required, but I prefer the use of two with their axles set at right angles to each other, as thereby the force of the wind can be utilized no matter in what direction the wind is blowing.

Having described my invention what I claim is:

A wind motor comprising two wind wheels having horizontal axles mounted near the surface of the ground, the axle of one wind wheel being in a vertical plane at right angles to the vertical plane of the axle of the other wheel; a driven axle in alinement with the axle of one of the wheels; a clutch normally connecting the driven shaft to the axle of the wheel; a bevel gear mounted upon said driven shaft; a stub shaft mounted in alinement with the axle of the other wheel; a clutch normally connecting the stub axle with the axle of said last wheel; a bevel gear mounted on said stub shaft; said bevel gear meshing with the gear on the driven shaft; permanent barriers extending upwardly from the surface of the ground to near the center of the wheels; other barriers extending upwardly from the surface of the ground between the wheels; movable deflectors pivotally mounted at the rear of the wheels on a line substantially on the same plane with the top of the permanent barriers; means to secure the free ends of the deflectors in the position to protect the top portion of the wheel from the force of the wind and to deflect the wind striking the deflector upon the bottom portion of the wheel; and pivoted protecting aprons in front of said wheels.

In witness that I claim the foregoing I have hereunto subscribed my name this 19th day of February, 1910.

ROBIN W. VAUGHAN.

Witnesses:
G. E. HARPHAM,
S. B. AUSTIN.